(12) United States Patent
Striegler et al.

(10) Patent No.: US 9,641,242 B2
(45) Date of Patent: May 2, 2017

(54) OPTICAL COMMUNICATION SYSTEM, DEVICE AND METHOD FOR DATA PROCESSING IN AN OPTICAL NETWORK

(75) Inventors: Arne Striegler, Munich (DE); Lutz Rapp, Deisenhofen (DE)

(73) Assignee: Xieon Networks S.a.r.l., Luxembourg (LU)

( * ) Notice: Subject to any disclaimer, the term of this patent is extended or adjusted under 35 U.S.C. 154(b) by 0 days.

(21) Appl. No.: 14/123,557

(22) PCT Filed: Jun. 18, 2012

(86) PCT No.: PCT/EP2012/061561
§ 371 (c)(1),
(2), (4) Date: Mar. 5, 2014

(87) PCT Pub. No.: WO2013/000750
PCT Pub. Date: Jan. 3, 2013

(65) Prior Publication Data
US 2014/0186021 A1    Jul. 3, 2014

(30) Foreign Application Priority Data

Jun. 28, 2011   (EP) .................................... 11171624

(51) Int. Cl.
*H04B 10/00*   (2013.01)
*H04B 10/03*   (2013.01)
*H04J 14/02*   (2006.01)

(52) U.S. Cl.
CPC .......... *H04B 10/03* (2013.01); *H04J 14/0221* (2013.01)

(58) Field of Classification Search
USPC ........................................................ 398/1–9
See application file for complete search history.

(56) References Cited

U.S. PATENT DOCUMENTS

| 5,133,031 | A | * | 7/1992 | Tanaka | G02B 6/28 |
|   |   |   |   |   | 385/24 |
| 5,555,478 | A | * | 9/1996 | Zelikovitz | H04Q 11/0067 |
|   |   |   |   |   | 340/2.1 |
| 6,501,871 | B1 | * | 12/2002 | Sucharczuk | H04B 10/2755 |
|   |   |   |   |   | 385/24 |

(Continued)

FOREIGN PATENT DOCUMENTS

| WO | 2010/036265 A1 | 4/2010 |
| WO | 2013/000750 A1 | 1/2013 |

OTHER PUBLICATIONS

Tsushima, Hideaki et al., "Optical Cross-Connect System for Survivable Optical Layer Networks," Hitachi Review, vol. 47(2):85-90 (1998).

(Continued)

*Primary Examiner* — Agustin Bello
(74) *Attorney, Agent, or Firm* — Nelson Mullins Riley & Scarborough LLP

(57) ABSTRACT

An optical communication system, a method and a network device for an optical network are provided, wherein the device comprises a first port coupled with a first optical fiber link, a second port coupled with a second optical fiber link, the first port and the second port being configured to be coupled with respect to each other in case of a failure of the first optical fiber link or in case of a failure of the second optical fiber link.

15 Claims, 7 Drawing Sheets

(56) References Cited

U.S. PATENT DOCUMENTS

| | | | | |
|---|---|---|---|---|
| 6,583,899 | B1* | 6/2003 | Casanova | H04B 10/077 398/173 |
| 6,618,522 | B2* | 9/2003 | Sucharczuk | H04B 10/2755 385/24 |
| 6,623,186 | B2* | 9/2003 | Rumer | H04J 14/0212 398/43 |
| 6,757,493 | B1* | 6/2004 | Sucharczuk | H04B 10/07 398/19 |
| 6,934,469 | B2* | 8/2005 | Feinberg | H04B 10/032 398/19 |
| 7,042,839 | B2* | 5/2006 | Stewart | H04L 45/00 370/227 |
| 7,877,008 | B2* | 1/2011 | Li | H04J 14/0227 398/19 |
| 8,233,791 | B2* | 7/2012 | Zheng | H04J 3/14 398/12 |
| 2005/0013532 | A1* | 1/2005 | Heiles | H04J 14/0291 385/16 |
| 2005/0276563 | A1 | 12/2005 | Faure et al. | |
| 2006/0056842 | A1* | 3/2006 | Li | H04J 14/0227 398/12 |
| 2009/0047012 | A1 | 2/2009 | Young | |
| 2010/0322618 | A1* | 12/2010 | Zheng | H04J 3/14 398/2 |
| 2014/0186021 | A1* | 7/2014 | Striegler | H04J 14/0221 398/2 |

OTHER PUBLICATIONS

International Search Report and Written Opinion for Application No. PCT/EP2012/061561, 11 pages, dated Oct. 19, 2012.

\* cited by examiner

OPTICAL COMMUNICATION SYSTEM, DEVICE AND METHOD FOR DATA PROCESSING IN AN OPTICAL NETWORK

RELATED APPLICATIONS

This application is a 35 U.S.C. 371 national stage filing of International Application No. PCT/EP2012/061561, filed on Jun. 18, 2012, which claims priority to and benefit of European Patent Application No. 11171624.7, filed Jun. 28, 2011, the contents of each of which are hereby incorporated by reference herein.

FIELD OF THE INVENTION

The invention relates to a method, a system and a device for data processing in an optical network. In particular, the invention relates to connection interruptions of optical networks.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Optical amplifiers are employed in the field of optical transmission technology for amplifying the optical signals transmitted in an optical network. The optical signals in many cases propagate over long links measuring several hundred kilometers and more in an optical fiber, being attenuated in the process. It is therefore necessary to amplify the optical signals when they have been transmitted over a long distance.

Optical links and networks of this type frequently employ Wavelength Division Multiplexing (WDM), a technique whereby a plurality of channels is transmitted in an optical fiber simultaneously at various wavelengths.

Erbium-doped fiber amplifiers (EDFAs) are largely employed in WDM transmission systems. An EDFA operates using an erbium-doped fiber into which the light from an optical pump, for example a laser diode, is coupled. The optical signal launched into the doped fiber is therein amplified by means of stimulated photon emission.

The optical signals are transmitted from one network node (cross-connect, XC) to another network node over a chain of transmission fibers interrupted by inline optical amplifiers.

FIG. 1 is a diagrammatic representation of an optical network 11 with five cross-connects (XC), namely XC1, XC2, XC3, XC4, and XC5. In the cross-connects, signals from many cross-connects are routed to different directions. This can be seen in FIG. 1 as an example: cross-connect XC4 routes the optical signals λ1 and λ2 from the cross-connect XC5 to the cross-connect XC3 and backwards from XC3 to XC5 along the paths 14 and 15; similarly XC4 routes the optical signals λ3 and λ4 from the cross-connect XC5 to the cross-connect XC1 and backwards from the cross-connect XC1 to XC5 along the paths 12 and 15; in a similar way the cross-connect XC4 routes the optical signal λ5 from XC1 to XC3 and backwards from XC3 to XC1 along the paths 12 and 14; in a similar fashion XC4 routes the optical signal λ6 from XC2 to XC3 and backwards from XC3 to XC2 along the paths 13 and 14, and the optical signal λ7 from XC1 to XC2 and backwards from XC2 to XC1 along the paths 12 and 13. The paths 12, 13, 14 and 15 described in FIG. 1 may include two different optical fibers.

The inline amplifier's gain depends on the defined output power $P_{out}$, on the properties of the preceding fiber and strongly on the number of channels. As an example, the gain factor G of an inline amplifier 16 located between XC4 and XC5 is $G = P_{out}/P_{in}$, where $P_{out}$ is the desired sum signal power of the signals $\lambda_1, \lambda_2, \lambda_3$ and $\lambda_4$ and $P_{in}$ is the sum input signal power of the signals $\lambda_1, \lambda_2, \lambda_3$ and $\lambda_4$ at the amplifier's input. The sum signal power $P_{out}$ is defined by the network planner and can be normally a fixed value. The amplifier 16 measures the incoming sum signal power $P_{in}$ and adapts the gain factor G so that the desired sum output power $P_{out}$ can be obtained.

FIG. 2 is a diagrammatic representation of an optical network 21, which is similar to the optical network 11 of FIG. 1 but, unlike the optical network 11, it has an interrupted link 28 so that no signal can be transmitted anymore between the cross-connects XC3 and XC4 along the path 24. As a consequence, cross-connect XC4 cannot route the optical signals λ1 and λ2 from the cross-connect XC5 to the cross-connect XC3 and backwards from XC3 to XC5 along the paths 24 and 25, or the optical signal λ5 from XC1 to XC3 and backwards from XC3 to XC1 along the paths 24 and 22, or the optical signal λ6 from XC2 to XC3 and backwards from XC3 to XC2 along the paths 24 and 23. As a further consequence, along the path 25 and in particular on the fiber 251, from the cross-connect XC4 to the cross-connect XC5, only the two backwards signals λ3 and λ4 can be transmitted and not λ1 and λ2. In this way, the amplifier 26 measures the sum power of λ3 and λ4, and this may results in a reduction of the sum input and sum output power of, for example, 3 dB. Although the amplifiers may try to keep the gain constant there could be some overshoots generated by the population of the third energy level and by an imperfect prediction of the required pump power.

The temporary increase of the signal power may result in dynamic impairments, the so-called transients, while static impairments are mainly due to spectral reconfiguration, which may include, for example, non-linear effects, spectral hole burning, intra-band Raman effects and Brillouin scattering.

As a consequence, the planned optical performance cannot be guaranteed anymore as the channel power is increased. Moreover, the signal power at the receiver can be too high, so that high optical power may destroy sensitive components of the receiver, such as, for example, the photo-diode.

A known way to suppress transients is adding additional lasers which replace the signal power of the lost signals, so that the sum input power in an amplifier is kept constant. These lasers are usually continuous wave signals at defined wavelengths. However, this solution may require a high number of additional lasers which reduce the number of wave length channels. Moreover, due to the high optical power of the fill lasers high non-linear effects might occur especially on low dispersion fibre types.

The problem to be solved is to overcome the disadvantages stated above and in particular to provide a solution that in case of a connection interruption suppress transients efficiently without influencing the transmission performance of other channels.

SUMMARY OF THE INVENTION

In order to overcome the above-described need in the art, the present invention discloses a network device for an optical network comprising a first port coupled with a first optical fiber link, a second port coupled with a second optical fiber link, wherein the first port and the second port are configured to be coupled with respect to each other in case of a failure of the first optical fiber link or in case of a failure of the second optical fiber link.

In a next embodiment of the invention the first port is configured to be shunted with the second port in case of a failure of the first optical fiber link or in case of a failure of the second optical fiber link.

In other embodiments of the present invention, the network device is a cross-connect element.

The problem stated above is also solved by a system for an optical network comprising a network device which includes a first port coupled with a first optical fiber link and a second port coupled with a second optical fiber link and a coupling unit configured to couple the first port with the second port of the network device in case of a failure of the first optical fiber link or in case of a failure of the second optical fiber link.

It is also an embodiment, that the coupling unit is a shunting element.

In a further embodiment, the network device of the system is a cross-connect element.

In a next embodiment the system for an optical network further comprises a detecting unit configured to detect a failure of the first or of the second optical fiber link.

According to an alternative embodiment of the invention, the detecting unit is a photo diode.

It is also an embodiment, that the network device includes the detecting unit.

In a further embodiment, the coupling unit includes the detecting unit.

In a next embodiment, the coupling unit comprises an actuating element configured to couple the first port with the second port in case of a failure of the first optical fiber link or in case of a failure of the second optical fiber link, the actuating element being a Variable Optical Attenuator (VOA) or a switching element.

In a further embodiment, the coupling unit further comprises a controlling unit connected with the detecting unit and with the actuating element configured to instruct the actuating element to couple the first port with the second port in case the detecting unit detects a failure of the first optical fiber link or a failure of the second optical fiber link.

In a next embodiment, the coupling unit comprises a first amplifier connected with the first port, with the detecting unit, with the controlling unit and with the actuating element; a second amplifier connected with the second port; a first coupler connected with the first amplifier and a second coupler connected with the second amplifier.

It is also an embodiment, that the first amplifier comprises a fist pump laser and the second amplifier comprising a second pump laser, the coupling unit further comprising a third pump laser connected with the first and with the second amplifier, the fist and the second pump lasers being configured to be turned off and the third pump laser being configured to be turned on in case of a failure of the first optical fiber link or of the second optical fiber link is detected.

The problem stated above is also solved by a method for an optical network, the optical network comprising network device having a first port coupled with a first optical fiber link and a second port coupled with a second optical fiber link, the method comprising coupling the fist port with the second port in case of a failure of the first optical fiber link or of the second optical fiber link.

The method, the device and the system provided, in particular, bear the following advantages:
a) They can be cost-effectively implemented in existing networks elements employing a limited number of additional components.
b) They do not involve additional power consumption.
c) Remarkable performance improvement can be achieved, in particular the "switching" can be fast enough to suppress transients efficiently without influencing the transmission performance of other channels.
d) They do not involve a reduced number of available channels.
e) In case of a fiber break, the power launched into the transmission fiber can be reduced to an allowed level within a predefined time interval, thereby preserving the safety of the optical components.

BRIEF DESCRIPTION OF THE DRAWINGS

The invention is explained by way of example in more detail below with the aid of the attached drawings.

DESCRIPTION OF THE INVENTION

Figure 1:
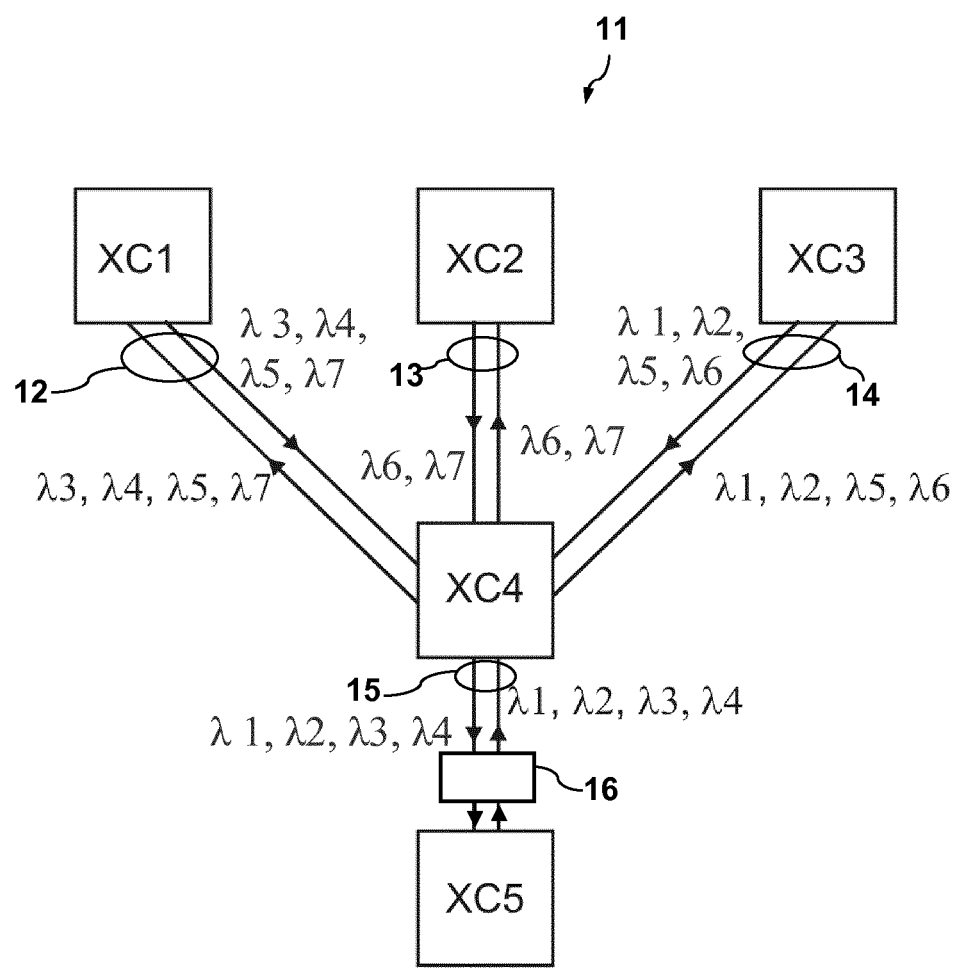
FIG. 1 is a diagrammatic representation of an optical network.
Figure 2:
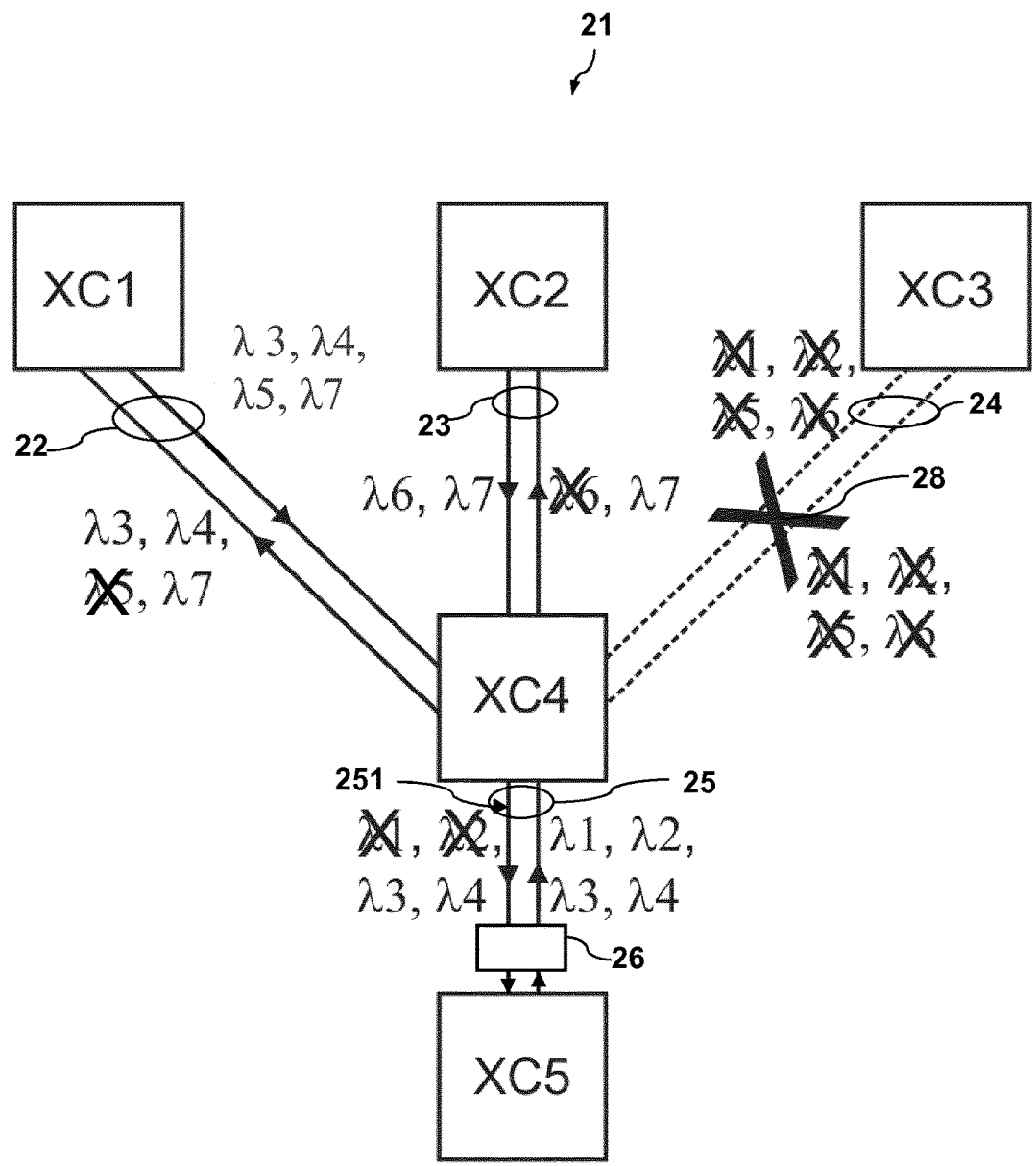
FIG. 2 is a diagrammatic representation of an optical network having an interrupted link.

As regards the description of FIGS. 1 and 2, reference is made to the background of the invention.

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 3:
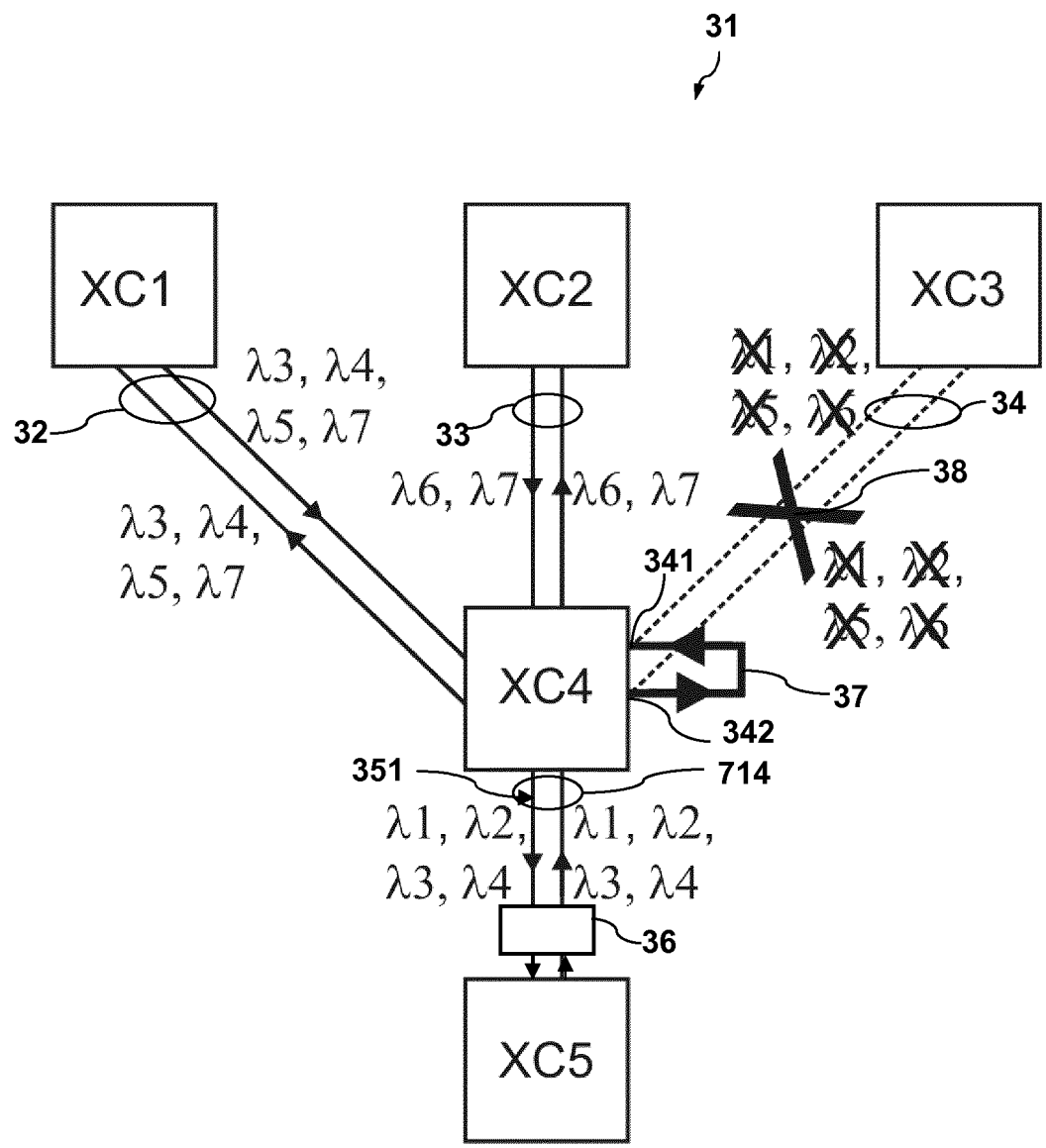
FIG. 3 is a diagrammatic representation of an optical network including the shunt according to an embodiment of the present invention.

FIG. 3 is a diagrammatic representation of an optical network 31, which, similarly to the optical network 21 of FIG. 2, has an interrupted link 34 so that no signal can be transmitted between the cross-connects XC3 and XC4 along the path 34. However, differently from the optical network 21 of FIG. 2, in the optical network 31, according to an embodiment of the present invention, a "shunt" has been added to the output of cross-connect XC4, so that the outgoing signal 342 is coupled to the cross-connects input 341. The forward and backward signals between two cross-connects are transmitted over two separated fibers, but signals have the same wavelengths. In the case of a fiber break 34 the lost channels of the incoming signals are replaced by the outgoing signals. Using this shunt, exactly the same wavelengths are replaced, so that the signals of the remaining network are not affected. They act like optimized fill lasers.

As a consequence, due to the fiber break 38, cross-connect XC4 cannot route the optical signals λ1 and λ2 from the cross-connect XC5 to the cross-connect XC3 along the path 34. However, thanks to the shunt 37, the two backwards signals λ1 and λ2 can be transmitted from the cross-connect XC4 to the cross-connect XC5 along the path 35 and in particular on the fiber 351. In this way, the amplifier 36 measures the sum power of λ1, λ2, λ3 and λ4, and therefore no reduction of the sum input and sum output power occurs. As an effect, overshoots can be avoided and an optimum transient suppression can be avoided.

Similarly, due to the fiber break 38, cross-connect XC4 cannot route the optical signal λ5 from XC1 to XC3 along the path 34, however, thanks to the shunt 37, the backward signal λ5 can be transmitted from the cross-connect XC4 to the cross-connect XC5 along the path 32.

In a similar way, due to the fiber break 38, cross-connect XC4 cannot route the optical signal λ6 from XC2 to XC3 along the path 34, however, thanks to the shunt 37, the backward signal λ6 can be transmitted from the cross-connect XC4 to the cross-connect XC2 along the path 33.

The shunt can be made by means of a shunting device, which may be integrated in the cross-connect XC4 or installed as an external network card coupled with the cross-connect XC4.

Figure 4:
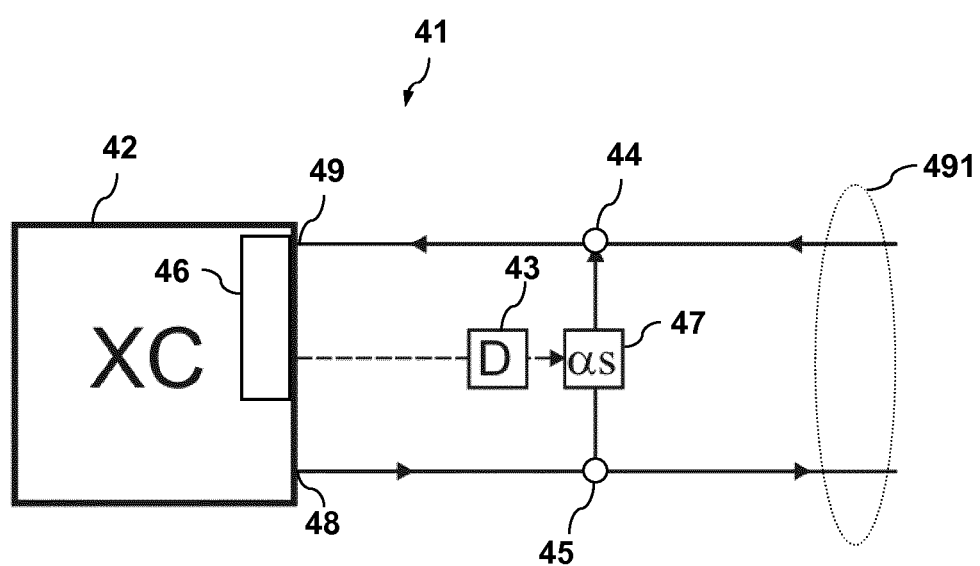
FIG. 4 is a diagrammatic representation of an illustrative example of realization of the shunt according to an embodiment of the invention.

FIG. 4 is a diagrammatic representation of an illustrative example of realization of the shunt according to an embodiment of the invention. The embodiment 41 of FIG. 4 is realized as an extra card. However, according to an alternative embodiment of the invention, the shunting device can be included in the cross connect. In particular FIG. 4 shows that the switching can be realized by splitting the outgoing signals (for example, signals λ1, λ2, λ3 and λ4) at the output 48 of the cross-connect 42 by a coupler 45 and coupling them again to the incoming signal 49 by another coupler 44 at the input of the cross-connect 42. A Variable Optical Attenuator (VOA) 47 (αs) or alternatively an optical switch may be configured to activate the signal replacement realizing the shunt if a fiber break is detected on the path 491. The loss of the signals can be detected by a photo diode 46, which may be read by a controller 43 (D), which can decide to shunt the outgoing signals or not. The photo diode 46 in the illustrative embodiment shown in FIG. 4 is included in the cross connect 42 and can be read out by the extra card. Alternatively a photo diode may be implemented on the extra shunt-card.

Figure 5:
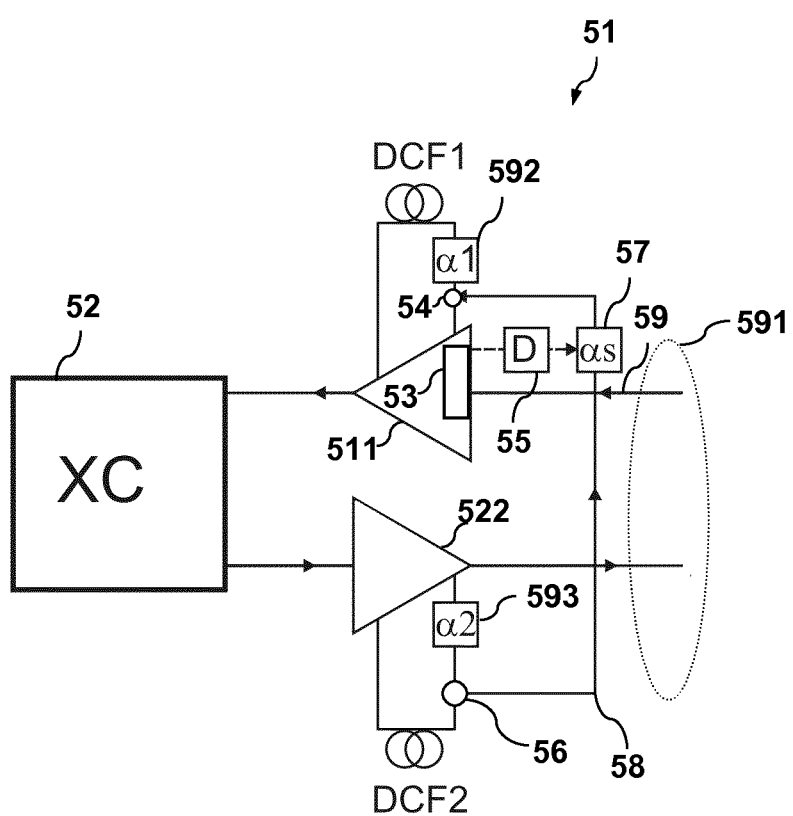
FIG. 5 is a diagrammatic representation of an illustrative example of realization of the shunt according to an alternative embodiment of the invention.

FIG. 5 is a diagrammatic representation of an illustrative example of realization of the shunt according to an embodiment of the invention. In particular in FIG. 5 the shunt is implemented into the pre-amplifier 511 (amplifier of the incoming signals 59) and into the booster amplifier 522 (amplifier of the outgoing signals 59). A Dispersion-Compensating Fiber module DCF1 and an additional loss 592 (α1) are placed between the two amplifier stages of the pre-amplifier 511. A Dispersion-Compensating Fiber module DCF2 and an additional loss 593 (α2) are placed between the two amplifier stages of the booster amplifier 522. A coupler 56 can split the signal, and the loss α2 then can be reduced by the loss of the coupler 56, so that no additional loss is inserted. The (outgoing) signal 58 is coupled into the amplifier of the incoming signal 511 by a coupler 54. A Variable Optical Attenuator (VOA) 57 (αs) or alternatively an optical switch may be configured to activate the signal replacement realizing the shunt if a fiber break is detected on the path 591.

The loss of the signals can be detected by a photo diode 53 or generally by a photo detector, which may be read by a controller 55 (D), which can decide to shunt the outgoing signals or not. The photo diode 53 in the illustrative embodiment shown in FIG. 5 is included in pre-amplifier 511. Alternatively a photo diode or photo detector may be implemented externally. Alternatively to the employment of couplers, switches could be used to realize the shunting device described in FIG. 4 and FIG. 5. The optical shunt could also be realized by simply using the cross-connects available input and output ports.

Figure 6:
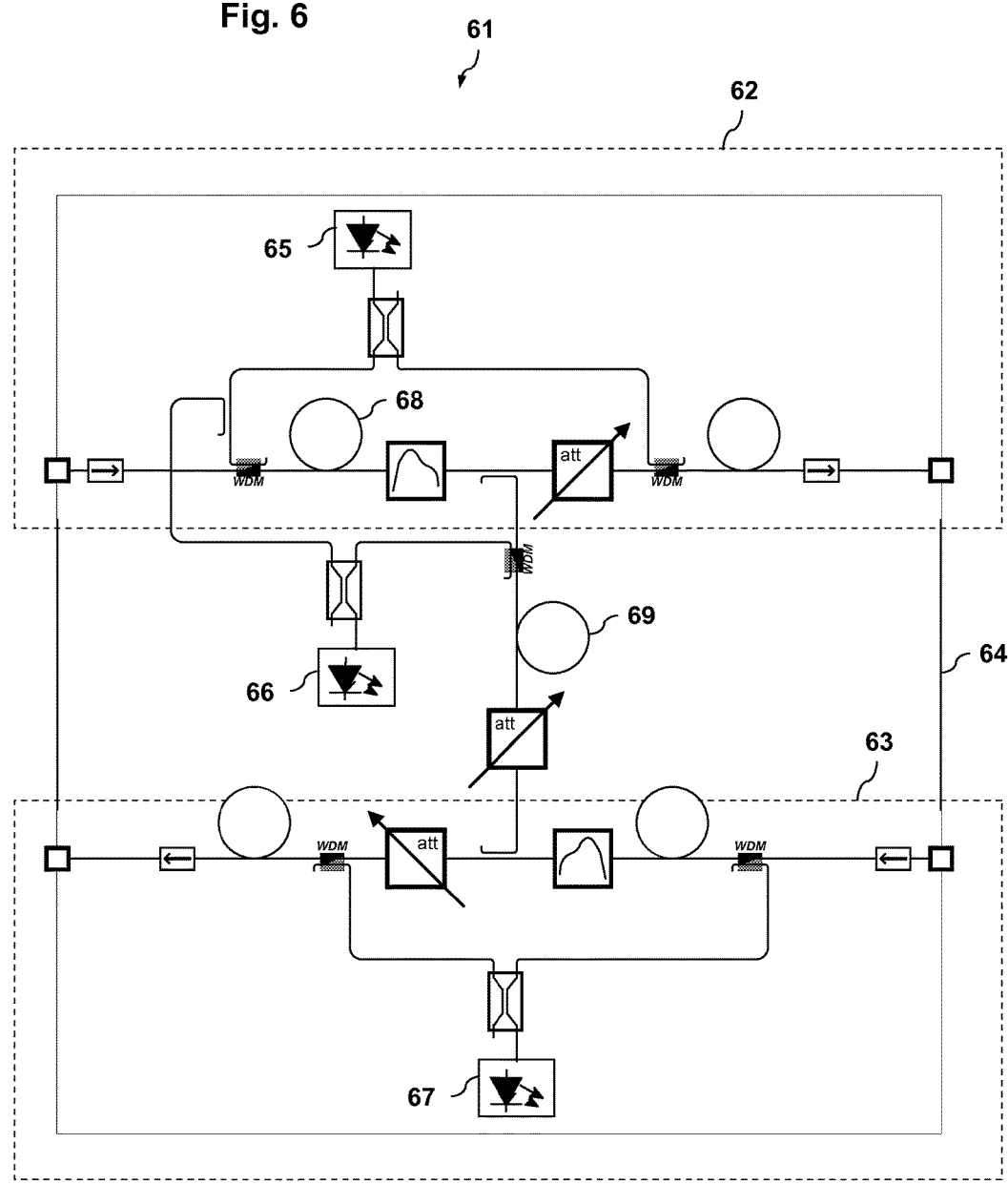
FIG. 6 is a diagrammatic representation of an illustrative example of realization of the shunt according to an alternative embodiment of the invention.

FIG. 6 is a diagrammatic representation of an illustrative example 61 of realization of the shunt according to an embodiment of the invention. In particular in FIG. 6 the shunt is implemented into the pre-amplifier 63 (amplifier of the incoming signals) and into the booster amplifier 62 (amplifier of the outgoing signals) in a common housing. Although the pre-amplifier 63 and the booster amplifier 62 can be realized in separate housing, the setup 61 is particularly cost efficient.

Without fiber break, the first pump laser 67 and the second pump laser 65 are turned on, whereas the third pump laser 66 is turned off. Since the erbium-doped fiber (EDF) 69 connecting the two amplifiers is not pumped, the signal is largely attenuated and only a negligible part of the signal power in the upper path is launched into the preamplifier 63.

In case of a fiber break, the amplifier 61 shuts down the first pump laser 67 and the second pump laser 65. Thus, there is no power launched any more into the broken fiber. The speed of this mechanism is high enough to comply with current laser safety rules. However, at the same time, the third pump laser 66 is turned on. In this way, the erbium-doped fiber (EDF) coil 68 of the booster 62 as well as the connecting erbium-doped fiber (EDF) coil 69 are pumped and the signals are redirected. The attenuation of the additional amplifier can been adjusted in a turn up procedure to a value guaranteeing that the total signal power in the preamplifier remains almost constant. In this way, the powers of the lightwaves coupled back into the preamplifier may correspond to the power values without fiber break.

Figure 7A:
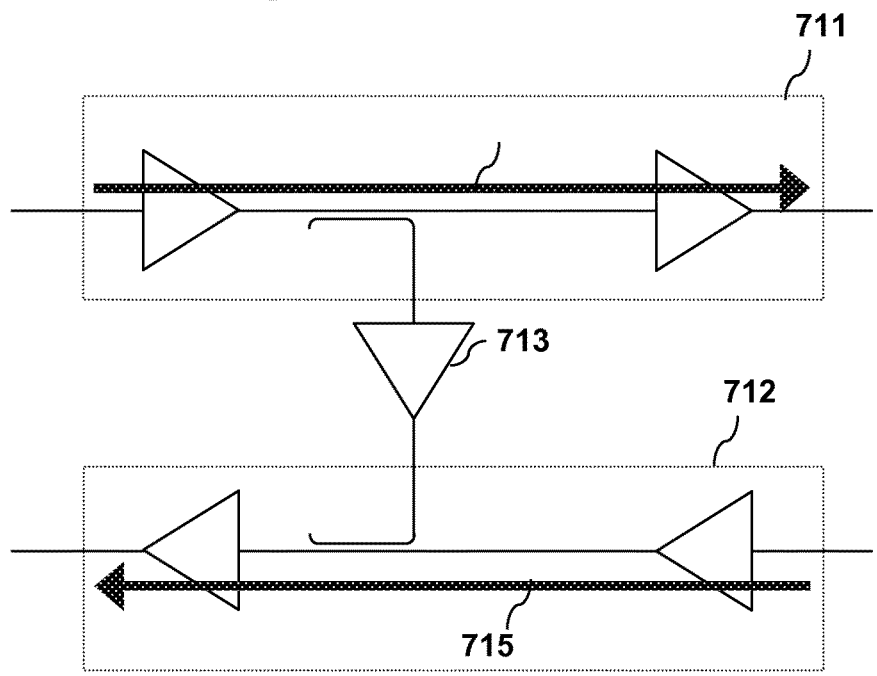
FIG. 7a is a diagrammatic representation of the signal propagation before the fiber break according to an embodiment of the invention.

FIG. 7a is a diagrammatic representation of the signal propagation before the fiber break according to an embodiment of the invention. In particular FIG. 7a schematically illustrates the setup 61 shown in FIG. 6 with the pre-amplifier 712, the booster amplifier 711, the third pump laser 713, the signal propagation 714 within the booster amplifier 711 and the signal propagation 714 within the pre-amplifier 712 before the fiber break.

Figure 7B:
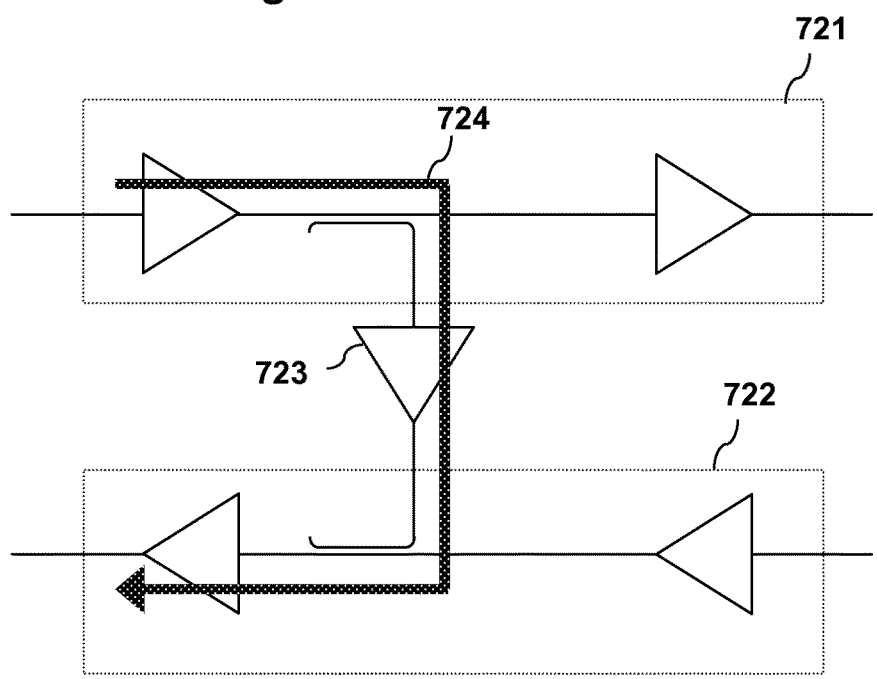
FIG. 7b is a diagrammatic representation of the signal propagation after the fiber break according to an embodiment of the invention.

FIG. 7b is a diagrammatic representation of the signal propagation after the fiber break according to an embodiment of the invention. In particular FIG. 7b schematically illustrates the setup 61 shown in FIG. 6 with the pre-amplifier 722, the booster amplifier 721, the third pump laser 723 and the signal propagation 723 after the fiber break.

The invention claimed is:

1. A network device for an optical network comprising:
a first port coupled with a first optical fiber link, the first port being an output port of said network device, the output port configured to transmit an outgoing signal from said network device to a second network device of the optical network;

a second port coupled with a second optical fiber link, the second port being an input port of said network device, said input port configured to receive an incoming signal from said second network device via said second optical fiber link, said outgoing and incoming signals travelling in opposite directions;

wherein the first port and the second port, which are substantially uncoupled with each other such that no or only a negligible part of the outgoing signal is launched into the second port under normal operation, are configured to be coupled with respect to each other in case a failure of the first optical fiber link or in case a failure of the second optical fiber link is detected, such that lost channels of the incoming signal are replaced by the outgoing signal having a same propagation direction at the second port as the lost channels under the normal operation.

2. A network device according to claim 1, wherein the first port is configured to be shunted with the second port in case of a failure of the first optical fiber link or in case of a failure of the second optical fiber link.

3. A network device according to claim 1, the network device being a cross-connect element.

4. A system for an optical network comprising:
a network device including a first port coupled with a first optical fiber link and a second port coupled with a second optical fiber link, the first port being an output port of said network device, said output port configured to transmit an outgoing signal from said network device to a second network device of the optical network, and the second port being an input port of said network device, said input port configured to receive an incoming signal from said second network device via said second optical fiber link, said outgoing and incoming signals travelling in opposite directions; and a coupling unit configured to couple the first port with the second port, which are substantially uncoupled with each other such that no or only a negligible part of the outgoing signal is launched into the second port under normal operation, of the network device in case a failure of the first optical fiber link or in case of a failure of the second optical fiber link is detected such that lost channels of the incoming signal are replaced by the outgoing signal having a same propagation direction at the second port as the lost channels under the normal operation.

5. A system as claimed in claim 4, the coupling unit being a shunting element.

6. A system according to claim 4, the network device being a cross-connect element.

7. A system according to claim 4, further comprising a detecting unit configured to detect a failure of the first or of the second optical fiber link.

8. A system according to claim 7, the detecting unit being a photo diode.

9. A system according to claim 7, the network device including the detecting unit.

10. A system according to claim 7, the coupling unit including the detecting unit.

11. A system according to claim 4, the coupling unit comprising an actuating element configured to couple the first port with the second port in case of a failure of the first optical fiber link or in case of a failure of the second optical fiber link, the actuating element being a Variable Optical Attenuator (VOA) or a switching element.

12. A system according to claim 11, the coupling unit further comprising a controlling unit connected with the detecting unit and with the actuating element configured to instruct the actuating element to couple the first port with the second port in case the detecting unit detects a failure of the first optical fiber link or a failure of the second optical fiber link.

13. A system according to claim 12, the coupling unit comprising:
a first amplifier connected with the first port, with the detecting unit, with the controlling unit and with the actuating element;
a second amplifier connected with the second port;
a first coupler connected with the first amplifier; and
a second coupler connected with the second amplifier.

14. A system according to claim 13, the first amplifier comprising a first pump laser and the second amplifier comprising a second pump laser, the coupling unit further comprising a third pump laser connected with the first and with the second amplifier, the first and the second pump lasers being configured to be turned off and the third pump laser being configured to be turned on in case of a failure of the first optical fiber link or of the second optical fiber link is detected.

15. A method for an optical network, the optical network comprising a network device having a first port being an output port of said network device, said output port coupled with a first optical fiber link and a second port coupled with a second optical fiber link, the first port being configured to transmit an outgoing signal from said network device to a second network device of the optical network, and the second port being an input port of said network device, said input port configured to receive an incoming signal from said second network device via said second optical fiber link, said outgoing and incoming signals travelling in opposite directions, the method comprising:
coupling the first port with the second port, which are substantially uncoupled with each other such that no or only a negligible part of the outgoing signal is launched into the second port under normal operation, in case a failure of the first optical fiber link or of the second optical fiber link is detected, such that lost channels of the incoming signal are replaced by the outgoing having a same propagation direction at the second port as the lost channels under the normal operation signal.

* * * * *